US012087907B2

(12) United States Patent
Liu et al.

(10) Patent No.: US 12,087,907 B2
(45) Date of Patent: Sep. 10, 2024

(54) ELECTROLYTE AND ELECTROCHEMICAL DEVICE USING THE SAME

(71) Applicant: NINGDE AMPEREX TECHNOLOGY LIMITED, Ningde (CN)

(72) Inventors: Junfei Liu, Ningde (CN); Lilan Zhang, Ningde (CN); Chao Tang, Ningde (CN); Jianming Zheng, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 976 days.

(21) Appl. No.: 16/976,938

(22) PCT Filed: Mar. 3, 2020

(86) PCT No.: PCT/CN2020/077645
§ 371 (c)(1),
(2) Date: Aug. 31, 2020

(87) PCT Pub. No.: WO2021/174421
PCT Pub. Date: Sep. 10, 2021

(65) Prior Publication Data
US 2023/0155173 A1 May 18, 2023

(51) Int. Cl.
*H01M 10/0567* (2010.01)
*H01M 4/48* (2010.01)
*H01M 4/587* (2010.01)
*H01M 10/0525* (2010.01)
*H01M 10/42* (2006.01)
*H01M 4/02* (2006.01)
(Continued)

(52) U.S. Cl.
CPC ....... *H01M 10/0567* (2013.01); *H01M 4/483* (2013.01); *H01M 4/587* (2013.01);
(Continued)

(58) Field of Classification Search
CPC ......... H01M 10/0567; H01M 10/0568; H01M 10/052; H01M 10/0525
See application file for complete search history.

(56) References Cited

U.S. PATENT DOCUMENTS

| | | | |
|---|---|---|---|
| 9,991,559 | B2 | 6/2018 | Zhang et al. |
| 2002/0025477 | A1* | 2/2002 | Itagaki ............ H01M 4/505 429/231.1 |

(Continued)

FOREIGN PATENT DOCUMENTS

| | | |
|---|---|---|
| CN | 101673852 A | 3/2010 |
| CN | 102195082 A | 9/2011 |
| CN | 102195083 A | 9/2011 |
| CN | 102760906 A | 10/2012 |
| CN | 105793244 A | 7/2016 |
| CN | 106571486 A | 4/2017 |
| CN | 109193028 A | 1/2019 |
| CN | 109980225 A | 7/2019 |

OTHER PUBLICATIONS

Chinese First Office Action of Nov. 15, 2021; and Supplementary Search Report mailed Nov. 5, 2021 in counterpart Chinese application 202080003226.0, 8 pages in Chinese.
Chinese Second Office Action mailed Apr. 18, 2022 in counterpart Chinese application 202080003226.0, 7 pages in Chinese.
PCT International Search Report mailed Dec. 4, 2020 in counterpart PCT application PCT/CN2020/077645, 5 pages in Chinese.
PCT Written Opinion mailed Dec. 4, 2020 in counterpart PCT application PCT/CN2020/077645, 3 pages in Chinese.

*Primary Examiner* — Jeremiah R Smith
(74) *Attorney, Agent, or Firm* — XSENSUS LLP

(57) ABSTRACT

An electrolyte including an imidazolium salt compound and a pyridine compound. The electrolyte, includes a compound of Formula I and a compound of Formula II:

Formula I

Formula II where $R_1$ is selected from halo, cyano, substituted or unsubstituted $C_1$-$C_{12}$ alkyl, substituted or unsubstituted $C_2$-$C_{12}$ alkenyl, substituted or unsubstituted $C_2$-$C_{12}$ alkynyl, substituted or unsubstituted $C_2$-$C_{12}$ alkoxy, substituted or unsubstituted $C_3$-$C_{12}$ cycloalkyl, and substituted or unsubstituted $C_6$-$C_{12}$ aryl; and $R_{11}$, $R_{12}$, $R_{13}$, $R_{14}$ and $R_{15}$ are each independently selected from H, halo, cyano, substituted or unsubstituted $C_1$-$C_{12}$ alkyl, substituted or unsubstituted $C_2$-$C_{12}$ alkenyl, substituted or unsubstituted $C_2$-$C_{12}$ alkynyl, substituted or unsubstituted $C_2$-$C_{12}$ alkoxy, substituted or unsubstituted $C_3$-$C_{12}$ cycloalkyl, and substituted or unsubstituted $C_6$-$C_{12}$ aryl; when substituted, the substituent is halo or cyano. The electrolyte has high stability and can significantly improve the cycle performance and high-temperature storage performance of electrochemical devices.

9 Claims, No Drawings

(51) Int. Cl.
   *H01M 10/052* (2010.01)
   *H01M 10/0568* (2010.01)
(52) U.S. Cl.
   CPC ... *H01M 10/0525* (2013.01); *H01M 10/4235* (2013.01); *H01M 2004/027* (2013.01); *H01M 10/052* (2013.01); *H01M 10/0568* (2013.01); *H01M 2300/0025* (2013.01)

(56) References Cited

U.S. PATENT DOCUMENTS

| | | | |
|---|---|---|---|
| 2011/0214895 A1* | 9/2011 | Ihara | H01M 4/587 429/339 |
| 2011/0229769 A1* | 9/2011 | Ihara | H01M 10/0525 429/325 |
| 2012/0082903 A1 | 4/2012 | Zhang et al. | |
| 2014/0227584 A1* | 8/2014 | Holstein | H01M 10/0525 429/163 |
| 2015/0017551 A1 | 1/2015 | Schmidt | |
| 2015/0140443 A1* | 5/2015 | Takahashi | H01M 4/505 29/623.5 |
| 2015/0325880 A1* | 11/2015 | Kim | H01M 10/052 429/188 |
| 2016/0218357 A1* | 7/2016 | Yoshikawa | H01M 4/382 |
| 2016/0380309 A1 | 12/2016 | Schmidt et al. | |
| 2017/0025709 A1 | 1/2017 | Schmidt | |
| 2018/0062207 A1* | 3/2018 | Matsuoka | H01M 10/0568 |
| 2018/0277900 A1* | 9/2018 | Abe | H01M 4/525 |

\* cited by examiner

ELECTROLYTE AND ELECTROCHEMICAL DEVICE USING THE SAME

CROSS REFERENCE TO THE RELATED APPLICATIONS

The present application is a National Stage application of PCT international application: PCT/CN2020/077645, filed on Mar. 3, 2020, the disclosure of which is hereby incorporated by reference in its entirety.

TECHNICAL FIELD

The present application relates to energy storage technologies, and more particularly to an electrolyte and an electrochemical device containing the electrolyte.

DESCRIPTION OF RELATED ART

Electrochemical devices represented by lithium-ion batteries have the advantages of long cycle life, high energy density, environmental friendliness, and portability. They have been widely used in wearable devices, smart phones, drones, electric vehicles, and other fields, and will keep exploring markets in energy storage, power tools and other industrial fields. Since intelligent furniture, smart cities, and the Internet of Things, etc. have increasing requirements for smart devices, higher performance requirements have also been put forward for lithium-ion batteries that act as important energy sources for smart devices.

The improvement of the energy density of lithium-ion batteries is mainly achieved by increasing the upper-limit voltage of batteries and using electrode materials with higher energy density. However, with the increase of the upper-limit voltage of the lithium ion batteries, side reactions of electrolyte with electrode material increase, causing accelerated capacity decline during cycle processes. Negative electrode materials with higher energy density (such as silicon-carbon negative electrode) gradually expand in volume during cycle processes, and new interface exposed after solid-electrolyte interface (SEI) film on the surface of the electrode being destroyed reacts with the electrolyte, resulting in rapid capacity decline. These seriously affect service life of the batteries. How to enhance the stability of the electrode surface and improve the cycle life and safety of the batteries has become an urgent technical problem to be solved in the art.

SUMMARY

To solve the above technical problems, the present application provides an electrolyte and an electrochemical device including the electrolyte. The electrolyte has high stability, can reduce side reactions caused by electrolyte decomposition, and can form a stable protective layer on the surface of the electrode. The protective layer has a certain thermal stability and toughness, can improve the stability upon long-time cycling and under high temperature conditions and alleviate damage to the protective layer. Therefore, electrochemical devices using the electrolyte have excellent storage and cycle performance, and are particularly suitable for working in high-temperature environments.

A first aspect of the present application provides an electrolyte which includes an imidazolium salt compound and a pyridine compound.

According to some embodiments, the imidazolium salt compound includes a compound of Formula I, and the pyridine compound includes a compound of Formula II:

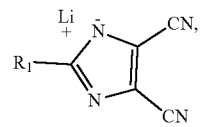

Formula I

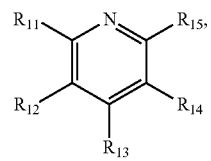

Formula II wherein:
  $R_1$ is selected from halo, cyano, substituted or unsubstituted $C_1$-$C_{12}$ alkyl, substituted or unsubstituted $C_2$-$C_{12}$ alkenyl, substituted or unsubstituted $C_2$-$C_{12}$ alkynyl, substituted or unsubstituted $C_2$-$C_{12}$ alkoxy, substituted or unsubstituted $C_3$-$C_{12}$ cycloalkyl, and substituted or unsubstituted $C_6$-$C_{12}$ aryl; and
  $R_{11}$, $R_{12}$, $R_{13}$, $R_{14}$ and $R_{15}$ are each independently selected from H, halo, cyano, substituted or unsubstituted $C_1$-$C_{12}$ alkyl, substituted or unsubstituted $C_2$-$C_{12}$ alkenyl, substituted or unsubstituted $C_2$-$C_{12}$ alkynyl, substituted or unsubstituted $C_2$-$C_{12}$ alkoxy, substituted or unsubstituted $C_3$-$C_{12}$ cycloalkyl, and substituted or unsubstituted $C_6$-$C_{12}$ aryl,
  wherein when substituted, the substituent is halo or cyano.

According to some embodiments, at least one of $R_{11}$, $R_{12}$, $R_{13}$, $R_{14}$ and $R_{15}$ is fluoro.

According to some embodiments, the compound of Formula I includes at least one of the following:

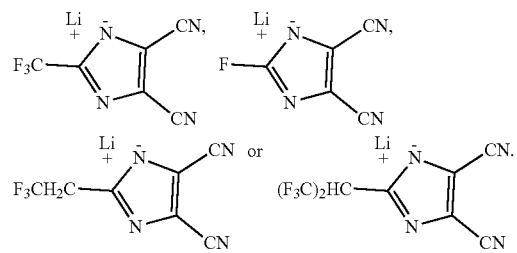

According to some embodiments, the compound of Formula II includes at least one of the following:

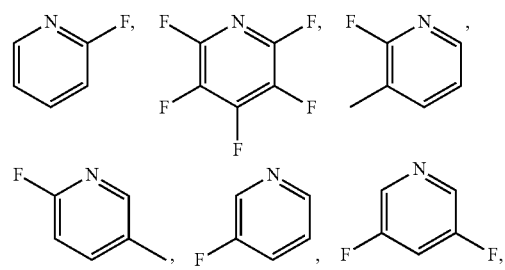

-continued

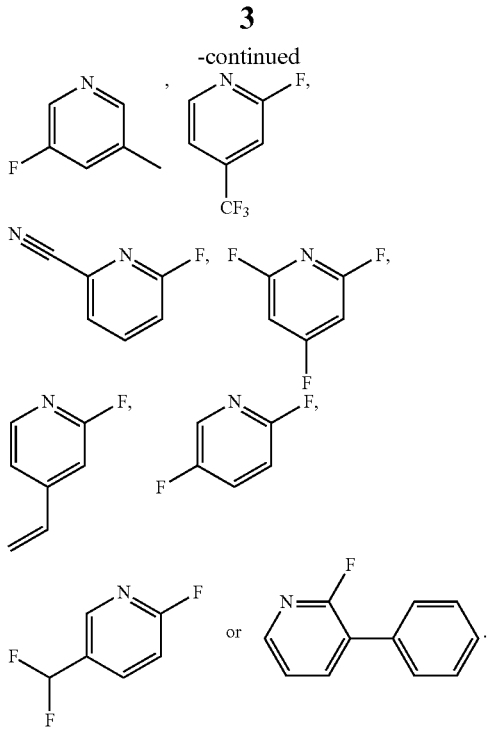

According to some embodiments, the electrolyte further includes a first additive, wherein the first additive includes at least one of 1,3-propane sultone, vinylene carbonate, fluoroethylene carbonate, 1,3-dioxane, succinic anhydride, adipodinitrile, 1,3,6-hexanetricarbonitrile, 1,2,6-hexanetricarbonitrile, 1,3,5-pentanetricarbonitrile, or lithium difluoro(oxalato)borate.

According to some embodiments, the electrolyte further includes a compound of Formula III:

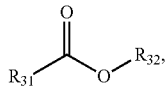

Formula III wherein $R_{31}$ and $R_{32}$ are each independently selected from substituted or unsubstituted $C_1$-$C_{12}$ alkyl, substituted or unsubstituted $C_2$-$C_{12}$ alkenyl, or substituted or unsubstituted $C_2$-$C_{12}$ alkynyl, wherein when substituted, the substituent is halo; and at least one of $R_{31}$ and $R_{32}$ is substituted with halo. According to some embodiments, the compound of Formula III in the electrolyte accounts for 5 wt % to 95 wt % based on the total weight of the organic solvent in the electrolyte.

According to some embodiments, the compound of Formula III includes at least one of:

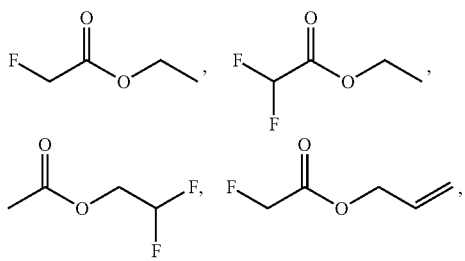

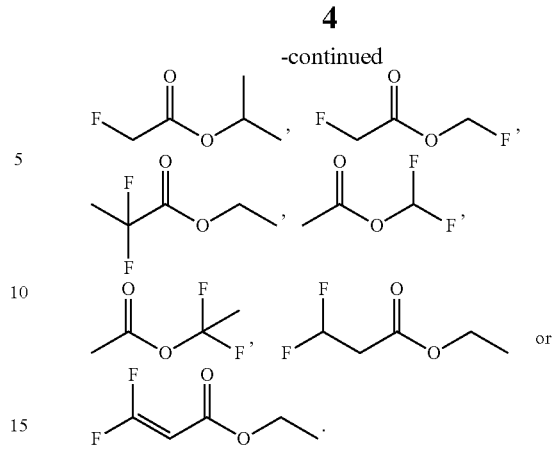

Another aspect of the present application provides an electrochemical device including a positive electrode, a negative electrode, and an electrolyte of the present application. The negative electrode includes a negative electrode active material, and the negative electrode active material includes at least one of the following: a carbon-containing material, a silicon-containing material, an alloy material, or a tin-containing material.

According to some embodiments, 0.00005 g to 0.08 g of the compound of Formula I is needed for each gram of the negative electrode active material.

According to some embodiments, 0.00005 g to 0.12 g of the compound of Formula II is needed for each gram of the negative electrode active material.

According to some embodiments, the compound of Formula III in the electrolyte accounts for 5 wt % to 95 wt % based on the total weight of the organic solvent in the electrolyte. According to some embodiments, in the electrochemical device, the silicon-containing material includes, on the surface, $M_aO_b$, wherein M is at least one of Al, Si, Ti, Mn, V, Cr, Co or Zr, $1 \leq a \leq 3$, and $1 \leq b \leq 5$.

According to some embodiments, in the electrochemical device, the silicon-containing material accounts for 5 wt % to 90 wt % based on the total weight of the negative electrode active material.

In another aspect, the present application provides an electronic device including any electrochemical device as described above.

Additional aspects and advantages of the embodiments of the present application will be described or shown in the following description or interpreted by implementing the embodiments of the present application.

DETAILED DESCRIPTION

Embodiments of the present application are described in detail below. Such embodiments should not be interpreted as limitations to the protection scope of the present application.

As used in the present application, the term "about" is used for describing and explaining minor variations. When being used in combination with an event or circumstance, the term may refer to an example in which the event or circumstance occurs precisely, and an example in which the event or circumstance occurs approximately. For example, when being used in combination with a value, the term "about" may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or subranges within the ranges, like explicitly specifying each value and each sub-range.

In the detailed description and the claims, a list of items connected by the term "one of" or similar terms may mean any of the listed items. For example, if items A and B are listed, then the phrase "one of A and B" or "at least one of A or B" means only A or only B. In another example, if items A, B, and C are listed, then the phrase "one of A, B and C" or "at least one of A, B or C" means only A; only B; or only C. The item A may include a single component or multiple components. The item B may include a single component or multiple components. The item C may include a single component or multiple components.

The term "alkyl group" is intended to be a linear saturated hydrocarbon structure having 1 to 12, 1 to 10, 1 to 8, 1 to 6, or 3 to 5 carbon atoms. "Alkyl group" is also intended to be a branched or cyclic hydrocarbon structure having 3 to 12, 3 to 10, 3 to 8, 3 to 6, or 3 to 5 carbon atoms. When an alkyl group having a specific number of carbon atoms is defined, it is intended to cover all geometric isomers having the carbon number. Therefore, for example, "butyl" means n-butyl, sec-butyl, isobutyl, tert-butyl and cyclobutyl; and "propyl" includes n-propyl, isopropyl and cyclopropyl. Examples of the alkyl group include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornanyl and so on.

The term "alkenyl group" refers to a monovalent unsaturated hydrocarbon group which may be straight or branched and which has at least one and usually 1, 2 or 3 carbon-carbon double bonds. Unless otherwise defined, the alkenyl group typically contains from 2 to 12, 2 to 10, 2 to 8, 2 to 6 or 2 to 4 carbon atoms and includes (for example) —$C_{2-4}$ alkenyl, —$C_{2-6}$ alkenyl, and —$C_{2-10}$ alkenyl. Representative alkenyl groups include (for example) ethenyl, n-propenyl, iso-propenyl, n-but-2-enyl, butyl-3-enyl, n-hex-3-enyl, and the like.

The term "alkynyl group" refers to a monovalent unsaturated hydrocarbon group which may be straight or branched and which has at least one and usually 1, 2 or 3 carbon-carbon triple bonds. Unless otherwise defined, the alkynyl group typically contains from 2 to 12, 2 to 10, 2 to 8, 3 to 6 or 2 to 4 carbon atoms and includes (for example) —$C_{2-4}$ alkynyl, —$C_{3-6}$ alkynyl, and —$C_{3-10}$ alkynyl. Representative alkynyl groups include (for example) ethynyl, prop-2-ynyl (n-propynyl), n-but-2-ynyl, n-hex-3-ynyl and the like.

The term "aryl" encompasses both monocyclic and polycyclic systems. A polycyclic ring may have two or more rings wherein two carbons are shared by two adjacent rings (wherein the rings are "fused"), wherein at least one of the rings is aromatic and other rings may be, for example, a cycloalkyl group, a cycloalkenyl group, an aryl group, a heterocyclyl group and/or a heteroaryl group. For example, the aryl group may be an aryl group having 6 to 12 carbon atoms, or an aryl group having 6 to 10 carbon atoms. Representative aryl group includes (for example) phenyl, methylphenyl, propylphenyl, isopropylphenyl, benzyl and naphthalen-1-yl, naphthalen-2-yl and the like.

The term "cycloalkyl group" encompasses cyclic alkyl groups. For example, the cycloalkyl group may be a cycloalkyl group having 3 to 12 carbon atoms, a cycloalkyl group having 3 to 10 carbon atoms, a cycloalkyl group having 3 to 6 carbon atoms, a cycloalkyl group having 5 to 12 carbon atoms, or a cycloalkyl group having 5 to 10 carbon atoms. Additionally, the cycloalkyl group can be optionally substituted.

The term "alkoxy group" encompasses an alkoxy group having 1-12 carbon atoms, an alkoxy group having 1-8 carbon atoms, an alkoxy group having 1-5 carbon atoms, an alkoxy group having 5-12 carbon atoms, an alkoxy group having 5-10 carbon atoms, or an alkoxy group having 5-8 carbon atoms. Additionally, the alkoxy group can be optionally substituted.

When the above substituents are substituted, their respective substituents are each independently selected from the group consisting of halo, an alkyl group, a cycloalkyl group, an alkenyl group, and an aryl group.

As used herein, the term "halo" encompasses fluoro (F), chloro (Cl), Bromo (Br) or iodo (I).

I. Electrolyte

The present application provides an electrolyte including an imidazolium salt compound and a pyridine compound.

According to some embodiments, the imidazolium salt compound includes a compound of Formula I:

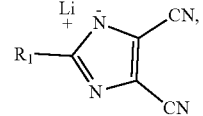

Formula I wherein:

$R_1$ is selected from halo, cyano, substituted or unsubstituted $C_1$-$C_{12}$ alkyl, substituted or unsubstituted $C_2$-$C_{12}$ alkenyl, substituted or unsubstituted $C_2$-$C_{12}$ alkynyl, substituted or unsubstituted $C_2$-$C_{12}$ alkoxy, substituted or unsubstituted $C_3$-$C_{12}$ cycloalkyl, and substituted or unsubstituted $C_6$-$C_{12}$ aryl, wherein when substituted, the substituent is halo or cyano.

According to some embodiments, $R_1$ is selected from halo, cyano, substituted or unsubstituted $C_1$-$C_{10}$ alkyl, substituted or unsubstituted $C_1$-$C_8$ alkyl, substituted or unsubstituted $C_1$-$C_6$ alkyl, substituted or unsubstituted $C_1$-$C_4$ alkyl, substituted or unsubstituted $C_2$-$C_{10}$ alkenyl, substituted or unsubstituted $C_2$-$C_8$ alkenyl, substituted or unsubstituted $C_2$-$C_6$ alkenyl, substituted or unsubstituted $C_2$-$C_4$ alkenyl, substituted or unsubstituted $C_2$-$C_{10}$ alkynyl, substituted or unsubstituted $C_2$-$C_8$ alkynyl, substituted or unsubstituted $C_2$-$C_6$ alkynyl, substituted or unsubstituted $C_2$-$C_4$ alkynyl, substituted or unsubstituted $C_2$-$C_{10}$ alkoxy, substituted or unsubstituted $C_2$-$C_8$ alkoxy, substituted or unsubstituted $C_2$-$C_6$ alkoxy, substituted or unsubstituted $C_2$-$C_4$ alkoxy, substituted or unsubstituted $C_3$-$C_{10}$ cycloalkyl, substituted or unsubstituted $C_3$-$C_8$ cycloalkyl, substituted or unsubstituted $C_3$-$C_6$ cycloalkyl, and substituted or unsubstituted $C_6$-$C_{10}$ aryl, wherein when substituted, the substituent is halo or cyano.

According to some embodiments, $R_1$ is selected from F, and the following groups that are unsubstituted or substituted with one or more F: methyl, ethyl, propyl, or isopropyl.

According to some embodiments, $R_1$ is selected from F, trifluoromethyl, —$CH_2CF_3$, or —$CH(CF_3)_2$.

According to some embodiments, the compound of Formula I includes at least one of the following:

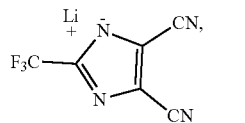

Compound I-1

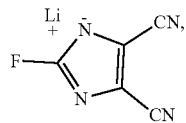

Compound I-2

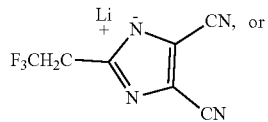

Compound I-3

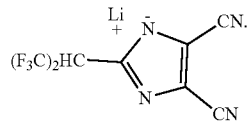

Compound I-4

According to some embodiments, the pyridine compound includes a compound of Formula II:

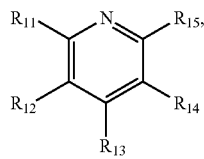

Formula II wherein $R_{11}$, $R_{12}$, $R_{13}$, $R_{14}$ and $R_{15}$ are each independently selected from H, halo, cyano, substituted or unsubstituted $C_1$-$C_{12}$ alkyl, substituted or unsubstituted $C_2$-$C_{12}$ alkenyl, substituted or unsubstituted $C_2$-$C_{12}$ alkynyl, substituted or unsubstituted $C_2$-$C_{12}$ alkoxy, substituted or unsubstituted $C_3$-$C_{12}$ cycloalkyl, and substituted or unsubstituted $C_6$-$C_{12}$ aryl, wherein when substituted, the substituent is halo or cyano.

According to some embodiments, $R_{11}$, $R_{12}$, $R_{13}$, $R_{14}$ and $R_{15}$ are each independently selected from H, halo, cyano, substituted or unsubstituted $C_1$-$C_{10}$ alkyl, substituted or unsubstituted $C_1$-$C_8$ alkyl, substituted or unsubstituted $C_1$-$C_6$ alkyl, substituted or unsubstituted $C_1$-$C_4$ alkyl, substituted or unsubstituted $C_2$-$C_{10}$ alkenyl, substituted or unsubstituted $C_2$-$C_8$ alkenyl, substituted or unsubstituted $C_2$-$C_6$ alkenyl, substituted or unsubstituted $C_2$-$C_4$ alkenyl, substituted or unsubstituted $C_2$-$C_{10}$ alkynyl, substituted or unsubstituted $C_2$-$C_8$ alkynyl, substituted or unsubstituted $C_2$-$C_6$ alkynyl, substituted or unsubstituted $C_2$-$C_4$ alkynyl, substituted or unsubstituted $C_2$-$C_{10}$ alkoxy, substituted or unsubstituted $C_2$-$C_8$ alkoxy, substituted or unsubstituted $C_2$-$C_6$ alkoxy, substituted or unsubstituted $C_2$-$C_4$ alkoxy, substituted or unsubstituted $C_3$-$C_{10}$ cycloalkyl, substituted or unsubstituted $C_3$-$C_8$ cycloalkyl, substituted or unsubstituted $C_3$-$C_6$ cycloalkyl, and substituted or unsubstituted $C_6$-$C_{10}$ aryl, wherein when substituted, the substituent is halo or cyano.

According to some embodiments, $R_{11}$, $R_{12}$, $R_{13}$, $R_{14}$ and $R_{15}$ are each independently selected from H, F, cyano, and the following grounds that are unsubstituted or substituted with one or more F: methyl, vinyl or phenyl.

According to some embodiments, $R_{11}$, $R_{12}$, $R_{13}$, $R_{14}$ and $R_{15}$ are each independently selected from H, F, cyano, methyl, difluoromethyl, trifluoromethyl, vinyl or phenyl.

According to some embodiments, at least one of $R_{11}$, $R_{12}$, $R_{13}$, $R_{14}$ and $R_{15}$ is F.

According to some embodiments, the compound of Formula II includes at least one of:

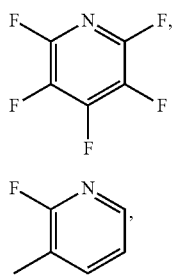

Compound II-1

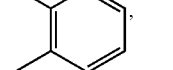

Compound II-2

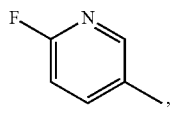

Compound II-3

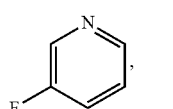

Compound II-4

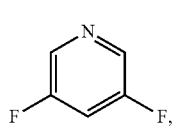

Compound II-5

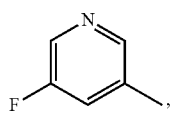

Compound II-6

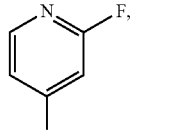

Compound II-7

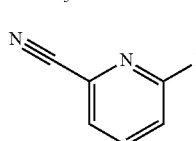

Compound II-8

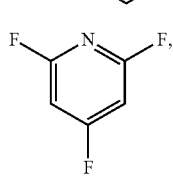

Compound II-9

Compound II-10

-continued

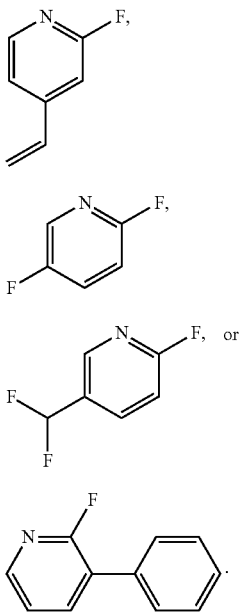

Compound II-11

Compound II-12

Compound II-13

Compound II-14

The compounds of Formula I and Formula II work together to optimize the structure and composition of the film formed, allow it to have both thermal stability and toughness, and alleviate the problem of cracking after volume expansion prone to occur when one of the compounds of Formula I and Formula II is used, thereby improving the cycle and high-temperature performance of the batteries.

In some embodiments, the electrolyte further includes an organic solvent and a lithium salt.

In some embodiments, the organic solvent includes a cyclic ester and a chain ester. The cyclic ester is at least one selected from the following: ethylene carbonate (EC), propylene carbonate (PC), or γ-butyrolactone (BL). The chain ester is at least one selected from dimethyl carbonate (DMC), diethyl carbonate (DEC), ethyl methyl carbonate (EMC), ethyl acetate (EA), methyl formate (MF), ethyl formate (EF), ethyl propionate (EP), propyl propionate (PP) or methyl butyrate (MB).

In some embodiments, the lithium salt is at least one of an organic lithium salt or an inorganic lithium salt. In some embodiments, the lithium salt includes at least one of the following: a fluorine element, a boron element, and a phosphorus element. In some embodiments, the lithium salt is at least one selected from lithium hexafluorophosphate (LiPF$_6$), lithium bis(trifluoromethanesulphonyl)imide (LiN(CF$_3$SO$_2$)$_2$), lithium bis(fluorosulfonyl)imide (Li(N(SO$_2$F)$_2$), lithium bis(oxalato)borate (LiB(C$_2$O$_4$)$_2$), lithium hexafluoroarsenate (LiAsF$_6$), lithium perchlorate (LiClO$_4$), or lithium trifluoromethanesulfonate (LiCF$_3$SO$_3$). In some embodiments, the lithium salt may be lithium hexafluorophosphate. In some embodiments, the content of the lithium salt is 0.5 M to 1.5 M. In some embodiments, the content of the lithium salt is 0.8 M to 1.2 M.

According to some embodiments, the electrolyte further includes a compound of Formula III:

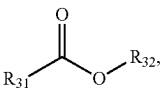

Formula III wherein $R_{31}$ and $R_{32}$ are each independently selected from substituted or unsubstituted $C_1$-$C_{12}$ alkyl, substituted or unsubstituted $C_2$-$C_{12}$ alkenyl, and substituted or unsubstituted $C_2$-$C_{12}$ alkynyl, wherein when substituted, the substituent is halo; and at least one of $R_{31}$ and $R_{32}$ is substituted with halo.

According to some embodiments, $R_{31}$ and $R_{32}$ are each independently selected from substituted or unsubstituted $C_1$-$C_{10}$ alkyl, substituted or unsubstituted $C_1$-$C_8$ alkyl, substituted or unsubstituted $C_1$-$C_6$ alkyl, substituted or unsubstituted $C_1$-$C_4$ alkyl, substituted or unsubstituted $C_2$-$C_{10}$ alkenyl, substituted or unsubstituted $C_2$-$C_8$ alkenyl, substituted or unsubstituted $C_2$-$C_6$ alkenyl, substituted or unsubstituted $C_2$-$C_4$ alkenyl, substituted or unsubstituted $C_2$-$C_{10}$ alkynyl, substituted or unsubstituted $C_2$-$C_8$ alkynyl, substituted or unsubstituted $C_2$-$C_6$ alkynyl, and substituted or unsubstituted $C_2$-$C_4$ alkynyl, wherein when substituted, the substituent is halo; and at least one of $R_{31}$ and $R_{32}$ is substituted with halo.

According to some embodiments, $R_{31}$ and $R_{32}$ are each independently selected from the following groups that are unsubstituted or substituted with one or more F: methyl, ethyl, propyl, isopropyl, vinyl or propenyl.

According to some embodiments, $R_{31}$ and $R_{32}$ are each independently selected from the following groups that are unsubstituted or substituted with one or more F: methyl, —CHF$_2$, —CH$_2$F, ethyl, —CH$_2$CHF$_2$, —CF$_2$CH$_3$, isopropyl, ethenyl, difluorovinyl or propenyl.

According to some embodiments, the compound of Formula III includes at least one of the following: fluorinated ethyl methyl carbonate, fluorinated dimethyl carbonate, fluorinated diethyl carbonate, fluorinated ethyl propionate, fluorinated propyl propionate, fluorinated methyl propionate, fluorinated ethyl acetate, fluorinated methyl acetate, or fluorinated propyl acetate.

According to some embodiments, the compound of Formula III includes at least one of the following:

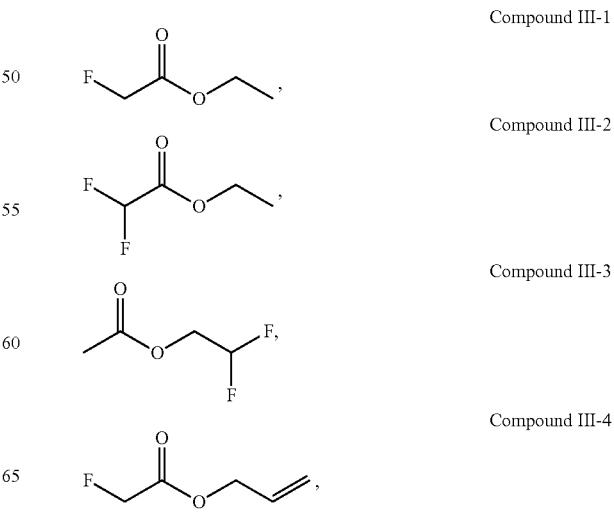

Compound III-1

Compound III-2

Compound III-3

Compound III-4

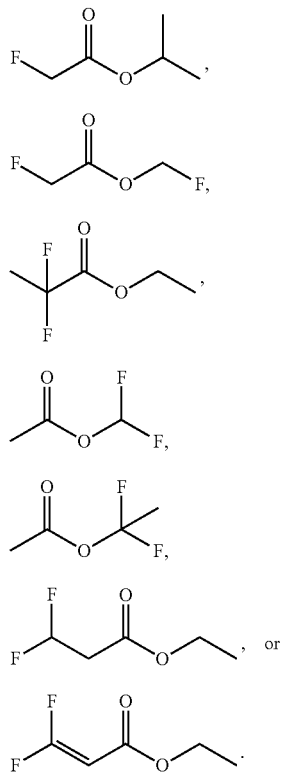

Compound III-5

Compound III-6

Compound III-7

Compound III-8

Compound III-9

Compound III-10, or

Compound III-11

The combination of the compound of Formula I and the compound of Formula II with the compound of Formula III has a relatively wide electrochemical window and a low viscosity, so that the storage and cycle performance of the electrochemical device can be further improved.

In some embodiments, the electrolyte is used in an electrochemical device. The electrochemical device includes a positive electrode and a negative electrode, wherein the negative electrode includes a negative electrode active material, and the negative electrode active material includes at least one of the following: a carbon-containing material, a silicon-containing material, an alloy material, or a tin-containing material.

In the electrolyte used in the electrochemical device according to some embodiments, 0.00005 g to 0.08 g of the compound of Formula I is needed for each gram of the negative electrode active material. In the electrolyte used in the electrochemical device according to some embodiments, 0.00005 g to 0.12 g of the compound of Formula II is needed for each gram of the negative electrode active material. When the contents of the compound of Formula I and the compound of Formula II are within such ranges, the cycle performance of the electrochemical device can be further improved.

In the electrolyte used in the electrochemical device according to some embodiments, 0.001 g to 0.02 g of the compound of Formula I is needed for each gram of the silicon-containing material.

In the electrolyte used in the electrochemical device according to some embodiments, 0.001 g to 0.05 g of the compound of Formula II is needed for each gram of the silicon-containing material.

In the electrolyte used in the electrochemical device according to some embodiments, for each gram of the negative electrode active material, the amount of the compound of Formula I is: 0.00001 g to 0.07 g, 0.00005 g to 0.06 g, 0.0001 g to 0.05 g, 0.0005 g to 0.04 g, 0.001 g to 0.03 g, or 0.005 g to 0.02 g; or for each gram of the negative electrode active material, the amount of the compound of Formula I is: about 0.0001 g, about 0.0002 g, about 0.0003 g, about 0.0004 g, about 0.0005 g, about 0.0006 g, about 0.0007 g, about 0.0008 g, or about 0.0009 g; or for each gram of the negative electrode active material, the amount of the compound of Formula I is: about 0.001 g, about 0.002 g, about 0.003 g, about 0.004 g, about 0.005 g, about 0.006 g, about 0.007 g, about 0.008 g, about 0.009 g, about 0.01 g, about 0.012 g, about 0.013 g, about 0.014 g, about 0.015 g, about 0.016 g, about 0.017 g, about 0.018 g, about 0.019 g or about 0.02 g, or a range delimited by any two of these values.

In the electrolyte used in the electrochemical device according to some embodiments, for each gram of the negative electrode active material, the amount of the compound of Formula II is: 0.00005 g to 0.1 g, 0.0001 g to 0.08 g, 0.0005 g to 0.06 g, 0.001 g to 0.04 g, or 0.005 g to 0.02 g; or for each gram of the negative electrode active material, the amount of the compound of Formula II is: about 0.0001 g, about 0.0002 g, about 0.0003 g, about 0.0004 g, about 0.0005 g, about 0.0006 g, about 0.0007 g, about 0.0008 g, or about 0.0009 g; or for each gram of the negative electrode active material, the amount of the compound of Formula II is: about 0.001 g, about 0.002 g, about 0.003 g, about 0.004 g, about 0.005 g, about 0.006 g, about 0.007 g, about 0.008 g or about 0.009 g; or for each gram of the negative electrode active material, the amount of the compound of Formula II is about 0.01 g, about 0.02 g, about 0.03 g, about 0.04 g, about 0.05 g, about 0.06 g, about 0.07 g, about 0.08 g, about 0.09 g, about 0.1 g, or about 0.11 g, or a range delimited by any two of these values.

According to some embodiments, in the electrochemical device, the electrolyte further includes a first additive, wherein said first additive includes at least one of 1,3-propane sultone (PS), vinylene carbonate (VC), fluoroethylene carbonate (FEC), 1,3-dioxane (DOL), succinic anhydride (SA), adipodinitrile (ADN), 1,3,6-hexanetricarbonitrile (HTCN), 1,2,6-hexanetricarbonitrile, 1,3,5-pentanetricarbonitrile, or lithium difluoro(oxalato)borate (LiDFOB). The compound of Formula I and the compound of Formula II work together with the first additive to further enhance the stability of the film formed on the electrode surface, thereby further improving the storage performance and cycle performance of the electrochemical device. For each gram of the negative electrode active material, the content of the first additive is: 0.001 g to 0.5 g, 0.002 g to 0.4 g, 0.004 g to 0.3 g, 0.006 g to 0.2 g, or 0.008 g to 0.1 g. When the content of the first additive is within said range, the storage performance and cycle performance of the electrochemical device can be further improved.

The electrolyte used in the electrochemical device according to some embodiments further contains a compound of Formula III, wherein the compound of Formula III accounts for 5 wt % to 95 wt %, 10 wt % to 80 wt %, 20 wt % to 65 wt %, or 30 wt % to 50 wt %, based on the total weight of the organic solvent in the electrolyte. According to some embodiments, the compound of Formula III accounts for about 10 wt %, about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, or about 90 wt %, based on the total weight of the solvent in the electrolyte.

II. Electrochemical Device

The electrochemical device of the present application includes any device wherein an electrochemical reaction takes place. Specific examples include all kinds of primary batteries, secondary batteries, fuel cells, solar cells, or capacitors. In particular, the electrochemical device is a lithium secondary battery including a lithium metal secondary battery, a lithium ion secondary battery, a lithium polymer secondary battery, or a lithium ion polymer secondary battery. In some embodiments, the electrochemical device of the present application is an electrochemical device comprising: a positive electrode having a positive electrode active material capable of absorbing and releasing metal ions, and a negative electrode having a negative electrode active material capable of absorbing and releasing metal ions; and said electrochemical device is characterized by including any electrolyte of the present application.

Electrolyte

The electrolyte used in the electrochemical device of the present application is any of the aforementioned electrolytes according to the present application. Moreover, the electrolyte used in the electrochemical device of the present application may include other electrolytes falling within the scope of present application.

Negative Electrode

The negative electrode material used in the electrochemical device of the present application, and the construction and manufacturing methods therefor are not particularly limited, and may be any of the techniques disclosed in the prior art. In some embodiments, the negative electrode may be one described in U.S. Pat. No. 9,812,739B, which is incorporated herein by reference in its entirety.

In some embodiments, the negative electrode includes a current collector and a negative electrode active material layer on the current collector. The negative electrode active material includes a material that reversibly intercalates/deintercalates lithium ions. In some embodiments, the material that reversibly intercalates/deintercalates lithium ions includes a carbon material. In some embodiments, the carbon material may be any carbon-based negative electrode active material commonly used in lithium-ion rechargeable batteries. In some embodiments, the carbon material includes, but is not limited to, crystalline carbon, amorphous carbon, or a mixture thereof. The crystalline carbon may be amorphous, plate-shaped, platelet-shaped, spherical or fibrous natural graphite or artificial graphite. The amorphous carbon may be soft carbon, hard carbon, carbonized mesophase pitch, calcined coke, and the like.

In some embodiments, the negative electrode active material layer includes a negative electrode active material. In some embodiments, the negative electrode active material includes at least one of the following: a carbon-containing material, a silicon-containing material, an alloy material, or a tin-containing material. In some embodiments, the negative electrode active material includes, but is not limited to, a lithium metal, a structured lithium metal, a natural graphite, an artificial graphite, mesocarbon microbead (MCMB), hard carbon, soft carbon, silicon, a silicon-carbon composite, a Li—Sn alloy, a Li—Sn—O alloy, Sn, SnO, $Sn_{O2}$, lithiated $TiO_2$—$Li_4Ti_5O_{12}$ having spinel structure, a Li—Al alloy, and any combination thereof.

When the negative electrode includes an alloy material, a negative electrode active material layer can be formed by vapor deposition, sputtering, or plating. When the negative electrode includes lithium metal, a negative electrode active material layer can be formed by for example a conductive skeleton of twisted spherical shape and metal particles dispersed in the conductive skeleton. In some embodiments, the conductive skeleton of twisted spherical shape may have a porosity of about 5% to about 85%. In some embodiments, a protective layer may be further disposed on the lithium metal-containing negative electrode active material layer.

In some embodiments, the silicon-containing material includes a silicon compound $SiO_x$ wherein $0.5<x<1.5$, an elemental silicon, or a mixture of thereof.

According to some embodiments, in the electrochemical device, the silicon-containing material includes, on the surface, $M_aO_b$, wherein M is at least one of the following: Al, Si, Ti, Mn, V, Cr, Co or Zr, wherein $1 \leq a \leq 3$, and $1 \leq b \leq 5$.

In some embodiments, the silicon-containing material includes, on the surface, $M_aO_b$ having a thickness of 2 nm to 1000 nm. In some embodiments, the thickness is 3 nm to 600 nm, 4 nm to 300 nm, or 5 nm to 100 nm.

In some embodiments, the particle size (Dv50) of the silicon-containing material is 1 micron to 8 microns. In some embodiments, the Dv50 is 2 microns to 7 microns, 3 microns to 6 microns, or 4 microns to 5 microns.

In some embodiments, the silicon-containing material has a BET of 1 $m^2/g$ to 50 $m^2/g$.

In some embodiments, the silicon-containing material accounts for 5% to 90%, 10% to 70%, or 20% to 50%, based on the total weight of the negative electrode active material.

In some embodiments, the negative electrode active material layer includes a binder, and optionally a conductive material. The binder increases the binding of the negative electrode active material particles to each other and the binding of the negative electrode active material to the current collector. In some embodiments, the binder includes, but is not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene butadiene rubber, acrylated styrene butadiene rubber, epoxy resins, Nylon and so on.

In some embodiments, the conductive material includes, but is not limited to, a carbon-based material, a metal-based material, a conductive polymer, or a mixture thereof. In some embodiments, the carbon-based material is selected from natural graphite, artificial graphite, carbon black, acetylene black, ketjen black, carbon fiber, or any combinations thereof. In some embodiments, the metal based material is selected from metal powders, metal fibers, copper, nickel, aluminum, and silver. In some embodiments, the conductive polymer is a polyphenylene derivative.

In some embodiments, the current collector includes, but is not limited to, copper foil, nickel foil, stainless steel foil, titanium foil, foamed nickel, foamed copper, polymeric substrates coated with a conductive metal, and any combinations thereof.

The negative electrode can be produced by a production method well known in the art. For example, the negative electrode can be obtained by mixing an active material, a conductive material and a binder in a solvent to prepare an active material composition, and coating the active material composition on a current collector. In some embodiments, the solvent may include, but is not limited to, water.

The material, structure, and manufacturing method of the negative electrode used in the embodiments of the present application include any of the techniques disclosed in the prior art.

In some embodiments, the negative electrode active material is a material containing a lithium metal. In some embodiments, the negative electrode active material is a lithium metal related negative electrode material selected from a lithium metal, a structured lithium metal, or a protective layer modified lithium metal. In some embodiments, the structured lithium metal negative electrode material can be formed by preparing a thickening agent, a conductive material and a filling material into a slurry, coating the slurry on a current collector, drying, and pressing the lithium metal into the film under a certain pressure.

In some embodiments, the negative electrode includes a lithium metal layer and a mesh insulating layer. The mesh insulating layer is provided on at least one surface of the lithium metal. The mesh insulating layer includes pores with a pore size of 10 nm to 5 microns and a porosity of 10%-50%, and the thickness of the insulating layer is 50 nm to 5 microns. The insulating layer material can be at least one selected from styrene-butadiene rubber (SBR), carboxymethyl cellulose (CMC), nylon, polyacrylic acid (PAA), polyvinyl alcohol (PVA), polylactic acid (PLA), polyethylene-vinyl acetate copolymer, PEVA/PLA, polymethyl methacrylate (PMMA)/tetrahydroperfluorooctyl acrylate (TAN), polyethylene oxide (PEO), polymethyl methacrylate (PMMA), polyamide (PA), polycaprolactone (PCL), polyethylimide (PEI), polycaprolactam, polyethylene (PE), polyethylene terephthalate (PET), polyolefin, polyphenylene ether (PPE), polyvinyl chloride (PVC), polyvinylidene chloride (PVDC), polyvinylidene fluoride (PVDF), poly (vinylidene fluoride-co-hexafluoropropylene) (PVDF-HFP), poly vinylpyridine, polylactic acid (PLA), polypropylene (PP), polybutene (PB), polybutylene terephthalate (PBT), polyamide (PA), polyimide (PI), polycarbonate (PC), polytetrafluoroethylene (PTFE), polystyrene, polyester (PE), acrylonitrile-butadiene-styrene (ABS), poly(methyl methacrylate) (PMMA), polyoxymethylene (POM), poly(ether sulfone) (PES), styrene-acrylonitrile (SAN), polyacrylonitrile (PAN), ethylene-vinyl acetate (EVA), styrene-maleic anhydride (SMA), and vinyl resins. The thickness of the lithium metal layer is 1 micron to 100 microns.

In some embodiments, the negative electrode includes a lithium metal layer and a passivation layer, the passivation layer is provided on at least a portion of the surface of the lithium metal. The passivation layer includes a particulate passivation layer and a film passivation layer, and the thickness of the passivation layer is 100 nm to 600 nm. When the passivation layer is particulate, the particle size is 10 nm to 500 nm. In some embodiments, the negative electrode includes a lithium metal layer and a carbonaceous material layer provided on the metal layer. In some embodiments, a polymer layer may be further included between the lithium metal layer and the carbonaceous material layer. The carbonaceous material layer is at least one selected from artificial graphite, natural graphite, graphene, carbon nanotubes, and carbon fibers.

Positive Electrode

The positive electrode material used in the electrochemical device of the present application can be prepared using materials, construction and manufacturing methods well known in the art. In some embodiments, the positive electrode of the present application can be prepared using the techniques described in U.S. Pat. No. 9,812,739B which is incorporated herein by reference in its entirety.

In some embodiments, the positive electrode includes a current collector and a positive electrode active material layer on the current collector. The positive electrode active material includes at least one lithiated intercalation compound that reversibly intercalates and deintercalates lithium ions. In some embodiments, the positive electrode active material includes a composite oxide. In some embodiments, the composite oxide contains lithium and at least one element selected from the group consisting of cobalt, manganese, and nickel.

In some embodiments, the positive electrode active material is one or more selected from lithium cobalt oxide (LCO), lithium manganese oxide (LMO), lithium nickel manganese oxide (LNMO), a lithium nickel manganese cobalt (NCM) ternary material, lithium salts with other transition metal oxides or lithium iron phosphate.

In some embodiments, the positive electrode active material is selected from doped lithium cobalt oxide having a chemical formula $Li_xCo_aM1_bO_{2-c}$, wherein M1 represents at least one selected from nickel (Ni), manganese (Mn), magnesium (Mg), aluminum (Al), boron (B), titanium (Ti), molybdenum (Mo), tin (Sn), calcium (Ca), strontium (Sr), tungsten (W), yttrium (Y), lanthanum (La), zirconium (Zr) and silicon (Si), and the values of x, a, b and c are in the following ranges: $0.8 \leq x \leq 1.2$, $0.8 \leq a \leq 1$, $0 \leq b \leq 0.2$, $-0.1 \leq c \leq 0.2$. In particular, M1 contains Mn dopant.

In some embodiments, the positive electrode active material may have a coating on its surface or may be mixed with another compound having a coating. The coating may include at least one coating element compound selected from the group consisting of an oxide of a coating element, a hydroxide of a coating element, an oxyhydroxide of a coating element, an oxycarbonate of a coating element, and a hydroxycarbonate of a coating element. The compound used for the coating may be amorphous or crystalline.

In some embodiments, the coating element contained in the coating may include Mg, Al, Co, K, Na, Ca, Si, Ti, V, Sn, Ge, Ga, B, As, Zr or any combinations thereof. The coating can be applied by any method as long as the method does not adversely affect the performance of the positive electrode active material. For example, the method may include any coating method known in the art, such as spraying, dipping, and others.

The positive electrode active material layer further includes a binder, and optionally a conductive material. The binder increases the binding of the positive electrode active material particles to each other and the binding of the positive electrode active material to the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene butadiene rubber, acrylated styrene butadiene rubber, epoxy resins, Nylon and so on.

In some embodiments, the conductive material includes, but is not limited to, a carbon-based material, a metal-based material, a conductive polymer, and a mixture thereof. In some embodiments, the carbon-based material is selected from natural graphite, artificial graphite, carbon black, acetylene black, ketjen black, carbon fiber, and any combinations thereof. In some embodiments, the metal-based material is selected from metal powders, metal fibers, copper, nickel, aluminum, and silver. In some embodiments, the conductive polymer is a polyphenylene derivative.

In some embodiments, the current collector may be, but is not limited to, aluminum.

The positive electrode can be prepared by a preparation method well known in the art. For example, the positive electrode can be obtained by mixing an active material, a conductive material and a binder in a solvent to prepare an active material composition, and coating the active material composition on a current collector. In some embodiments, the solvent may include, but is not limited to, N-methylpyrrolidone or the like.

In some embodiments, the positive electrode is prepared by forming a positive electrode material with a positive electrode active material layer including a lithium-transition metal compound powder and a binder on a current collector.

In some embodiments, the positive electrode active material layer can generally be produced by dry mixing a positive electrode material and a binder (and a conductive material and a thickener if needed) to form flakes, and pressing the obtained flakes on a positive electrode current collector; or dissolving or dispersing the material in a liquid medium to form a slurry, coating the slurry on a positive electrode current collector, and drying. In some embodiments, the material of the positive electrode active material layer includes any material known in the art.

Separator Film

In some embodiments, the electrochemical device of the present application is provided with a separator film between the positive electrode and the negative electrode to prevent short circuit. The material and shape of the separator film used in the electrochemical device of the present application are not particularly limited, and may be any techniques disclosed in the prior art. In some embodiments, the separator film includes a polymer or an inorganic substance or the like formed of a material which is stable against the electrolyte of the present application.

For example, the separator film may include a substrate layer and a surface treatment layer. The substrate layer is a non-woven fabric, film, or composite film having a porous structure, and the material of the substrate layer is at least one selected from the group consisting of polyethylene, polypropylene, polyethylene terephthalate, and polyimide. Particularly, a porous polypropylene film, a porous polyethylene film, a polypropylene nonwoven fabric, a polyethylene nonwoven fabric, or a porous polypropylene-polyethylene-polypropylene composite film may be used. One or more substrate layers may be present. When more than one substrate layers are present, the polymers in different substrate layers may have the same or different composition(s), and the weight average molecular weights are different. When more than one substrate layers are present, the shut-down temperature of the polymers in different substrate layers is different.

At least one surface of the substrate layer is provided with a surface treatment layer. Said surface treatment layer may be a polymer layer or an inorganic layer, or a layer formed by mixing a polymer and an inorganic material.

The inorganic layer includes inorganic particles and a binder. The inorganic particles are at least one selected from the group consisting of alumina, silica, magnesia, titania, hafnium dioxide, tin oxide, cerium dioxide, nickel oxide, zinc oxide, calcium oxide, zirconia, yttria, silicon carbide, eboehmite, aluminum hydroxide, magnesium hydroxide, calcium hydroxide and barium sulfate, or a combination of more than one thereof. The binder is one selected from the group consisting of polyvinylidene fluoride, a copolymer of vinylidene fluoride-hexafluoropropylene, a polyamide, polyacrylonitrile, a polyacrylate ester, polyacrylic acid, a polyacrylate salt, polyvinylpyrrolidone, polyvinyl ether, polymethyl methacrylate, polytetrafluoroethylene, and polyhexafluoropropylene, or a combination of more than one thereof. The polymer layer contains a polymer, and the material of the polymer includes at least one of a polyamide, polyacrylonitrile, a polyacrylate ester, polyacrylic acid, a polyacrylate salt, polyvinylpyrrolidone, polyvinyl ether, polyvinylidene fluoride or poly(vinylidene fluoride-hexafluoropropylene).

III. Application

The electrolytic solution according to the embodiments of the present application can enhance the rate performance of the battery, the capacity retention rate upon storage at normal temperature, and the cycle and high-temperature storage performance; therefore it is applicable to an electronic device including an electrochemical device.

The use of the electrochemical device according to the present application is not particularly limited, and can be used in various known applications, such as notebook computers, pen-input computers, mobile computers, e-book players, portable phones, portable fax machines, portable copiers, portable printers, head-mounted stereo headphones, video recorders, LCD TVs, portable cleaners, portable CD players, Mini discs, transceivers, electronic notebooks, calculators, memory cards, portable recorders, radios, backup power sources, motors, vehicles, motorcycles, scooters, bicycles, lighting apparatus, toys, game consoles, clocks, electric tools, flashing light, cameras, large batteries for household use, or lithium ion capacitors.

IV. EXAMPLES

Hereinafter, the present application will be specifically described by way of examples and comparative examples; however, the present application is not limited thereto as long as they do not deviate from the spirit of the present application.

1. Preparation of Lithium-ion Battery

The lithium-ion batteries in the examples and comparative examples were prepared as follows:

(1) Preparation of Electrolyte (1-1) In a glove box under a dry argon atmosphere, ethylene carbonate, propylene carbonate and dimethyl carbonate were mixed uniformly at a weight ratio of 2:2:6, and particular types and amounts of additives (for example, one or more of the compound of Formula I, the compound of Formula II and the first additive) were optionally added to the well mixed solvent. $LiPF_6$ was added, so that the lithium salt concentration in the finally obtained electrolyte was 1.10 mol/L.

(1-2) In a glove box under a dry argon atmosphere, ethylene carbonate, propylene carbonate, dimethyl carbonate, and the compound of Formula III were mixed uniformly at a weight ratio of 2:2:5:1, and then particular types and amounts of additives (for example, one or more of the compound of Formula I, the compound of Formula II and the first additive) were optionally added. $LiPF_6$ was added, so that the lithium salt concentration in the finally obtained electrolyte was 1.10 mol/L.

(2) Preparation of Positive Electrode 1.42 kg of N-methyl-2-pyrrolidone (NMP) (which is a solvent), 1.2 kg of polyvinylidene fluoride (PVDF) (which is a binder, 10 wt %), 0.16 kg of conductive graphite (which is a conductive agent), and 7.2 kg of the positive electrode active material (($LiCoO_2$) were weighed, thoroughly mixed and stirred to obtain a positive electrode slurry. The obtained positive electrode slurry was evenly coated on a 12-micron-thick aluminum foil acting as a positive electrode current collector, and then baked at 120° C. for 1 hour to obtain a positive electrode active material layer. Then, after the steps of pressing, cutting, and welding with lugs, a positive electrode was obtained.

(3) Preparation of Negative Electrode (3-1) Preparation of a Graphite Negative Electrode 1.2 kg carboxymethyl cellulose sodium (CMC) solution (1.5 wt %), 0.07 kg of styrene-butadiene rubber emulsion (which is a binder, 50 wt %), and 2.0 kg of graphite powder negative electrode active material were weighed. The materials were fully mixed and stirred to obtain a negative electrode slurry. The negative electrode slurry was then evenly coated on a 10-micron-thick copper foil acting as the current collector of the negative electrode, and then baked at 120° C. for 1 hour, to obtain a negative electrode active material layer. By adjusting the rolling pressure, the negative electrode was allowed to have a compacted density of about 1.7 g/cm$^3$. Then, after cutting and welding the electrode lug, a negative electrode was obtained.

(3-2) Preparation of a Negative Electrode Including a Composite Material of a Graphite Material and 10 wt % of a Silicon-Based Material (SiO$_x$):

1.2 kg carboxymethyl cellulose sodium (CMC) solution (1.5 wt %), 0.07 kg styrene-butadiene rubber emulsion (which is a binder, 50 wt %), 1.8 kg of graphite powder negative electrode active material, and 0.2 Kg of SiO$_x$ (0.5<x<1.5) were weighed. The materials were fully mixed and stirred to obtain a negative electrode slurry. The obtained negative electrode slurry was evenly coated on a 10-micron-thick copper film acting as a negative electrode current collector, and then baked at 120° C. for 1 hour to obtain a negative electrode active material layer. By adjusting the rolling pressure, the negative electrode was allowed to have a compacted density of about 1.7 g/cm$^3$. After cutting and welding the electrode lug, the negative electrode was obtained.

Content of silicon-based material=weight of silicon-based material/(weight of silicon-based material+weight of graphite material)×100%.

The silicon-based material has a Dv50 of about 6.1, a BET of about 5.3 m$^2$/g, and its surface is coated with a layer of Al$_2$O$_3$ with a thickness of 10 nm to 15 nm.

(3-3) Preparation of a Negative Electrode Including a Composite Material of a Graphite Material and 20 wt % Silicon-Based Material (SiO$_x$):

1.2 kg sodium carboxymethyl cellulose (CMC) solution (which is a thickener, 1.5 wt %), 0.07 kg styrene-butadiene rubber emulsion (which is a binder, 50 wt %), 1.6 kg of graphite powder negative electrode active material, and 0.4 Kg of SiO$_x$ (0.5<x<1.5) were weighed. The materials were fully mixed and stirred to obtain a negative electrode slurry. The obtained negative electrode slurry was then evenly coated on a 10-micron-thick copper foil acting as a negative electrode current collector, and then baked at 120° C. for 1 hour, to obtain a negative electrode active material layer. By adjusting the rolling pressure, the negative electrode was allowed to have a compacted density of 1.7 g/cm$^3$. After cutting and welding the electrode lug, a negative electrode was obtained.

Content of silicon-based material=weight of silicon-based material/(weight of silicon-based material+weight of graphite material)×100%.

The silicon-based material has a Dv50 of about 6.1, a BET of about 5.3 m$^2$/g, and its surface is coated with a layer of Al$_2$O$_3$ with a thickness of 10 nm to 15 nm.

(4) Preparation of Lithium-Ion Batteries

The positive electrode and negative electrode were separated with a polypropylene separator film having a thickness of about 9 microns, wound, and then placed in an aluminum foil packaging bag. After baking at 80° C. to remove water, the electrolyte was injected. After sealing, formation, venting, capacity test, and other procedures, a lithium-ion battery was obtained.

2. Performance of Lithium-Ion Batteries (1) Cycle performance of lithium-ion batteries At 45° C., the lithium-ion battery was allowed to stand for 30 minutes, then charged at a constant current of 0.5 C to a voltage of 4.4 V and then charged at a constant voltage of 4.4 V until the current is 0.05 C, allowed to stand for 5 minutes, and then discharged at a constant current of 0.5 C to a voltage of 3.0 V. This was a charge-discharge cycle. The corresponding discharge capacity was a first discharge capacity of the lithium ion battery. The lithium ion battery was amenable to 300 charge-and-discharge cycles as described above, and the discharge capacity during the N$^{th}$ cycle was detected, and the thickness after the N$^{th}$ cycle was measured.

Capacity retention rate (%) of lithium ion battery after N cycles=discharge capacity of the N$^{th}$ cycle/the first discharge capacity×100%. The capacity retention rate in the examples refers specifically to the capacity retention rate after 300 cycles.

Thickness change rate of lithium-ion batteries after N cycles=(thickness after the N$^{th}$ full charge/thickness after the first charge to 50% SOC−1)×100%. The thickness change rate in the examples refers specifically to the thickness change rate after 400 cycles of full charge.

(2) High-Temperature Performance of Lithium-Ion Batteries Upon Over Discharge

At 25° C., the post-cycle lithium-ion battery was discharged at a constant current of 0.05 C to a voltage of 0.5 V, and allowed to stand for 5 minutes. The over-discharged lithium ion battery was placed in an oven at 60° C. and stored for 15 days, and the thickness expansion rate of the lithium ion battery was recorded.

Thickness expansion rate (%) of lithium-ion battery after storage for 15 days after over discharge=(thickness of lithium ion battery on the 15$^{th}$ day after storage/thickness of lithium-ion battery after over discharge−1)×100%.

(3) Determination of HF Content in Electrolyte after High Temperature Storage

The test was conducted according to the Chinese National Standard HG/T 4067-2015 for lithium battery industry. The specific procedures are as follows. A NaOH standard solution was prepared, and bromothymol blue was used as an indicator. A blank sample was firstly titrated to blue, and the titrant's volume V0 was recorded. Then the electrolyte sample (weight m) was added and titrated to blue, and the titrant's volume V1 was recorded.

$$HF\ content(unit:ppm)=(V1-V0)\times 200/m.$$

A. The Electrolytes and Lithium Ion Batteries of Examples 1 to 20 and Comparative Examples 1 to 5 were Prepared Following the Methods as Described Above. The Cycling Capacity Retention Rate and Thickness Changes were Tested. The Test Results are Shown in Table 1.

In the lithium-ion batteries of Examples 1 to 20 and Comparative Examples 1 to 5, the negative electrode is the graphite negative electrode prepared using the method (3-1) above; and the electrolyte is prepared by the above method (1-1) or (1-2), wherein the types and amounts of the substances added to the electrolyte are shown in Table 1. In Table 1, the amounts of the compound of Formula I, the compound of Formula II and the first additive are expressed by the weight in gram of the corresponding substance required for each gram of negative electrode active material; and the amount of the compound of Formula III (such as Compound III-3) is expressed by the percentage by weight of the compound of Formula III present based on the total weight of the organic solvent in the electrolyte.

reduces the thickness change of batteries upon storage after over discharge, and improves the cycling capacity retention rate of the batteries, indicating that the combined use of the two plays a role in improving the storage and cycle performance of the batteries. It can be seen from the comparison of Example 1 and Examples 3 to 17 with Comparative Examples 1 to 5 that the addition of the compound of Formula III further reduces the thickness change of batteries

TABLE 1

| | Compd. III-3 (wt %) | Compd. of Formula I | Content of Compd. of Formula I (g) | Compd. of Formula II | Content of Compd. of Formula II (g) | Content of first additive (g) | Thickness change upon storage after over discharge | Cycling capacity retention rate | Post-cycle thickness change |
|---|---|---|---|---|---|---|---|---|---|
| Comparative Example 1 | \ | \ | \ | \ | \ | \ | >100% | 75.2% | 10.4% |
| Comparative Example 2 | 10 | \ | \ | \ | \ | \ | 20.5% | 84.5% | 9.3% |
| Comparative Example 3 | \ | Compd. I-1 | 0.0003 | \ | \ | \ | 15.5% | 85.2% | 8.6% |
| Comparative Example 4 | \ | \ | \ | Compd. II-1 | 0.0005 | \ | 17.1% | 85.8% | 8.2% |
| Comparative Example 5 | \ | \ | \ | \ | \ | 0.016 g PS | 35.3% | 84.9% | 8.3% |
| Example 1 | \ | Compd. I-1 | 0.0003 | Compd. II-1 | 0.0005 | \ | 6.7% | 86.7% | 8.1% |
| Example 2 | \ | Compd. I-1 | 0.0003 | Compd. II-1 | 0.0005 | 0.016 g PS | 5.9% | 87.1% | 8.0% |
| Example 3 | 10 | Compd. I-1 | 0.0001 | Compd. II-1 | 0.0005 | \ | 4.9% | 88.5% | 7.6% |
| Example 4 | 10 | Compd. I-1 | 0.0002 | Compd. II-1 | 0.0005 | \ | 4.7% | 88.8% | 7.3% |
| Example 5 | 10 | Compd. I-1 | 0.0005 | Compd. II-1 | 0.0005 | \ | 4.2% | 90.2% | 6.6% |
| Example 6 | 10 | Compd. I-1 | 0.0007 | Compd. II-1 | 0.0005 | \ | 3.1% | 90.6% | 6.1% |
| Example 7 | 10 | Compd. I-1 | 0.005 | Compd. II-1 | 0.0005 | \ | 2.0% | 90.8% | 6.0% |
| Example 8 | 10 | Compd. I-1 | 0.0003 | Compd. II-1 | 0.0001 | \ | 5.8% | 88.6% | 7.8% |
| Example 9 | 10 | Compd. I-1 | 0.0003 | Compd. II-1 | 0.005 | \ | 3.6% | 88.9% | 6.3% |
| Example 10 | 10 | Compd. I-1 | 0.0003 | Compd. II-1 | 0.01 | \ | 2.5% | 90.3% | 6.0% |
| Example 11 | 10 | Compd. I-1 | 0.0003 | Compd. II-1 | 0.008 | \ | 3.3% | 90.2% | 6.3% |
| Example 12 | 10 | Compd. I-1 | 0.0003 | Compd. II-1 | 0.0005 | \ | 3.3% | 90.5% | 6.1% |
| Example 13 | 10 | Compd. I-2 | 0.0003 | Compd. II-1 | 0.0005 | \ | 4.2% | 90.4% | 6.8% |
| Example 14 | 10 | Compd. I-4 | 0.0003 | Compd. II-1 | 0.0005 | \ | 4.3% | 90.2% | 6.7% |
| Example 15 | 10 | Compd. I-2 | 0.0003 | Compd. II-4 | 0.0005 | \ | 4.1% | 90.5% | 6.7% |
| Example 16 | 10 | Compd. I-1 | 0.0003 | Compd. II-5 | 0.0005 | \ | 4.2% | 90.4% | 6.8% |
| Example 17 | 10 | Compd. I-1 | 0.0003 | Compd. II-13 | 0.0005 | \ | 4.1% | 90.3% | 6.6% |
| Example 18 | 10 | Compd. I-1 | 0.0003 | Compd. II-1 | 0.0005 | 0.04 g FEC + 0.008 g PS | 2.9% | 90.8% | 6.5% |
| Example 19 | 10 | Compd. I-1 | 0.0003 | Compd. II-1 | 0.0005 | 0.04 g FEC + 0.008 g PS + 0.008 g HTCN | 2.5% | 91.2% | 6.3% |
| Example 20 | 10 | Compd. I-1 | 0.0003 | Compd. II-1 | 0.0005 | 0.04 g FEC + 0.008 g PS + 0.008 g HTCN + 0.006 g LiDFOB | 2.4% | 91.8% | 6.1% |

Note:
"/" denotes that the substance is not present.

It can be seen from the comparison between Example 1 and Comparative Example 1, Comparative Example 3, and Comparative Example 4 that, the addition of both the compound of Formula I and the compound of Formula II upon storage after over discharge, and improves the cycling capacity retention rate and cycling thickness change.

It can be seen from Example 2 and Examples 18 to 20 that further adding a specific amount of the first additive to the above electrolyte further enhances the stability of the film formed on the electrode surface, and further improves the storage performance after over discharge and the cycle life of the batteries.

B. The Electrolytes and Lithium-Ion Batteries of Examples 21 to 38 and Comparative Examples 6 to 9 were Prepared Following the Methods as Described Above. The Cycling Capacity Retention Rate and Thickness Changes were Tested. The Test Results are Shown in Table 2.

In the lithium ion batteries of Examples 21 to 38 and Comparative Examples 6 to 9, the negative electrode is a composite negative electrode including a graphite material and a silicon-based material prepared by the above method (3-2) or (3-3). In Comparative Examples 6 to 9 and Examples 21 to 36, a composite negative electrode including 10 wt % of a silicon-based material was used. In Examples 37 and 38, a composite negative electrode including 20 wt % of a silicon-based material was used. The electrolyte is an electrolyte prepared by the above method (1-1), wherein the types and amounts of the substances added to the electrolyte are shown in Table 2. In Table 2, the amounts of the compound of Formula I, the compound of Formula II and the first additive are expressed by the weight in gram of the corresponding substance required for each gram of $SiO_x$.

TABLE 2

| | Compound of Formula I | Content of Compound of Formula I (g) | Compound of Formula II | Content of Compound of Formula II (g) | First additive and content thereof | Thickness change upon storage after over discharge | Cycling capacity retention rate | Post-cycle thickness change |
|---|---|---|---|---|---|---|---|---|
| Comparative Example 6 | \ | \ | \ | \ | \ | >100% | <60% | * |
| Comparative Example 7 | \ | \ | \ | \ | 0.064 g FEC | 45.5% | 80.2% | 11.2% |
| Comparative Example 8 | Compound I-1 | 0.003 | \ | \ | 0.064 g FEC | 30.5% | 81.8% | 10.5% |
| Comparative Example 9 | \ | \ | Compound II-1 | 0.005 | 0.064 g FEC | 31.7% | 82.1% | 10.4% |
| Example 21 | Compound I-1 | 0.001 | Compound II-1 | 0.005 | 0.048 g FEC | 5.2% | 83.5% | 9.8% |
| Example 22 | Compound I-1 | 0.002 | Compound II-1 | 0.005 | 0.064 g FEC | 5.0% | 83.8% | 9.1% |
| Example 23 | Compound I-1 | 0.003 | Compound II-1 | 0.005 | 0.064 g FEC | 4.4% | 84.2% | 8.8% |
| Example 24 | Compound I-1 | 0.007 | Compound II-1 | 0.005 | 0.064 g FEC | 3.5% | 84.5% | 8.4% |
| Example 25 | Compound I-1 | 0.01 | Compound II-1 | 0.005 | 0.064 g FEC | 2.1% | 84.7% | 8.1% |
| Example 26 | Compound I-1 | 0.003 | Compound II-1 | 0.001 | 0.064 g FEC | 7.3% | 83.8% | 10.2% |
| Example 27 | Compound I-1 | 0.003 | Compound II-1 | 0.01 | 0.064 g FEC | 4.1% | 84.5% | 8.5% |
| Example 28 | Compound I-1 | 0.003 | Compound II-1 | 0.02 | 0.064 g FEC | 2.8% | 85.0% | 8.0% |
| Example 29 | Compound I-1 | 0.003 | Compound II-1 | 0.005 | 0.080 g FEC | 4.0% | 84.8% | 8.2% |
| Example 30 | Compound I-1 | 0.003 | Compound II-1 | 0.005 | 0.10 g FEC | 4.0% | 85.2% | 8.0% |
| Example 31 | Compound I-2 | 0.003 | Compound II-1 | 0.005 | 0.064 g FEC | 4.6% | 84.0% | 8.9% |
| Example 32 | Compound I-2 | 0.003 | Compound II-4 | 0.005 | 0.064 g FEC | 4.5% | 83.9% | 8.8% |
| Example 33 | Compound I-1 | 0.003 | Compound II-4 | 0.005 | 0.064 g FEC | 4.5% | 84.1% | 8.7% |
| Example 34 | Compound I-1 | 0.003 | Compound II-1 | 0.005 | 0.064 g FEC + 0.008 g PS | 3.8% | 84.5% | 8.6% |
| Example 35 | Compound I-1 | 0.003 | Compound II-1 | 0.005 | 0.064 g FEC + 0.008 g PS + 0.008 g HTCN | 2.5% | 85.1% | 8.6% |
| Example 36 | Compound I-1 | 0.003 | Compound II-1 | 0.005 | 0.064 g FEC + 0.008 g PS + 0.008 g HTCN + 0.004 g DOL | 2.2% | 85.2% | 8.5% |
| Example 37 | Compound I-1 | 0.003 | Compound II-1 | 0.005 | 0.16 g FEC | 6.8% | 75.7% | 11.5% |
| Example 38 | Compound I-1 | 0.003 | Compound II-1 | 0.005 | 0.16 g FEC + 0.008 g PS + 0.008 g HTCN + 0.004 g DOL | 5.5% | 76.3% | 11.2% |

Note:
"/" denotes that the substance is not present.
* Bulging occurred early during the storage process after over discharge in Comparative Example 6, and the battery capacity dropped sharply before reaching 300 cycles. Therefore, no data was obtained.

As can be seen from the comparison of Examples 21 to 38 with Comparative Examples 6 to 9, in the silicon system, the addition of the compounds of Formula I and Formula II to the electrolyte significantly reduces the thickness change upon storage after over discharge, and improves the cycling capacity retention rate and the post-cycle thickness change. This may be due to the improved stability of the film formed on the electrode surface.

C. The Electrolytes of Comparative Example 7 and Example 23 were Prepared According to the Above Method, and the HF Content During High-Temperature Storage of the Electrolyte was Tested. The Test Results are Shown in Table 3.

TABLE 3

HF content during storage of electrolyte (unit: ppm)

| | Storage temperature | 0 Day HF content (ppm) | 7 Days HF content (ppm) | 14 Days HF content (ppm) |
| --- | --- | --- | --- | --- |
| Comparative Example 7 | 0° C. | 71 | 88 | 74 |
| Comparative Example 7 | 20° C. | 71 | 120 | 131 |
| Comparative Example 7 | 45° C. | 71 | 237 | 351 |
| Example 23 | 0° C. | 50 | 55 | 65 |
| Example 23 | 20° C. | 50 | 86 | 102 |
| Example 23 | 45° C. | 50 | 146 | 211 |

From the comparison between Comparative Example 7 and Example 23, it can be seen that the addition of the compounds of Formula I and Formula II to the electrolyte can significantly reduce the HF content during storage of the electrolyte. This effect is still very good under a storage condition of 45° C.

In summary, the experimental results in Table 1, Table 2 and Table 3 confirm that the electrolyte of the present application and the electrochemical device using the electrolyte have excellent high-temperature storage and cycle performance.

Without wishing to be bound by theory, the above-mentioned excellent performance may be because the specific substances (such as the compound of Formula I, the compound of Formula II, or the compound of Formula III, etc.) added to the electrolyte of the present application enhance the stability of the film layer on the positive electrode and negative electrode surfaces, reduces the generation of HF in the electrolyte, and suppresses the destruction of the film layer on the surface of the electrode material, thereby effectively improving the cycle performance and high-temperature storage performance of the battery.

Throughout the specification, references to "embodiment", "part of embodiments", "one embodiment", "another example", "example", "specific example" or "part of examples" mean that at least one embodiment or example of the present application includes specific features, structures, materials or characteristics described in the embodiment or example. Thus, the descriptions appear throughout the specification, such as "in some embodiments," "in an embodiment," "in one embodiment," "in another example," "in an example," "in a particular example" or "for example," are not necessarily the same embodiment or example in the application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. An electrochemical device, comprising a positive electrode, a negative electrode, and an electrolyte, wherein the electrolyte comprises a compound of Formula I, a compound of Formula II, and a compound of Formula III:

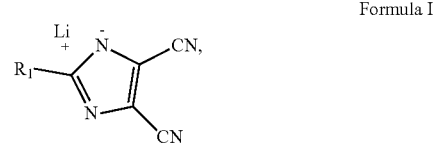

Formula I

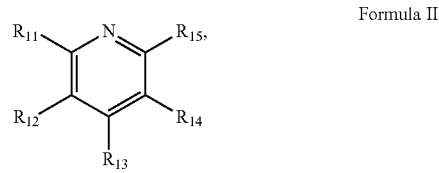

Formula II

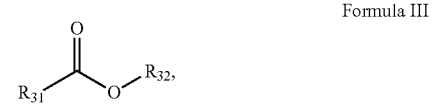

Formula III wherein, $R_1$ is selected from halo, cyano, substituted or unsubstituted $C_1$-$C_{12}$ alkyl, substituted or unsubstituted $C_2$-$C_{12}$ alkenyl, substituted or unsubstituted $C_2$-$C_{12}$ alkynyl, substituted or unsubstituted $C_2$-$C_{12}$ alkoxy, substituted or unsubstituted $C_3$-$C_{12}$ cycloalkyl, and substituted or unsubstituted $C_6$-$C_{12}$ aryl; and $R_{11}$, $R_{12}$, $R_{13}$, $R_{14}$ and $R_{15}$ are each independently selected from H, halo, cyano, substituted or unsubstituted $C_1$-$C_{12}$ alkyl, substituted or unsubstituted $C_2$-$C_{12}$ alkenyl, substituted or unsubstituted $C_2$-$C_{12}$ alkynyl, substituted or unsubstituted $C_2$-$C_{12}$ alkoxy, substituted or unsubstituted $C_3$-$C_{12}$ cycloalkyl, and substituted or unsubstituted $C_6$-$C_{12}$ aryl, and wherein when substituted, the substituent is halo or cyano;

$R_{31}$ and $R_{32}$ are each independently selected from substituted or unsubstituted $C_1$-$C_{12}$ alkyl, substituted or unsubstituted $C_2$-$C_{12}$ alkenyl, substituted or unsubstituted $C_2$-$C_{12}$ alkynyl, wherein when substituted, the substituent is halo, and at least one of $R_{31}$ or $R_{32}$ is substituted with halo; wherein the compound of Formula III in the electrolyte accounts for 5 wt % to 40 wt % based on the total weight of the organic solvent in the electrolyte;

the negative electrode comprises a negative electrode active material, and the negative electrode active material comprises at least one of a carbon-containing material or a silicon containing material; and the electrolyte has 0.0001-0.005 g of the compound of Formula I for each gram of the negative electrode active material, and 0.0001-0.01 g of the compound of Formula II for each gram of the negative electrode active material.

2. The electrochemical device according to claim 1, wherein the silicon-containing material comprises, on the surface, $M_aO_b$, wherein M is at least one of Al, Si, Ti, Mn, V, Cr, Co or Zr, wherein $1 \le a \le 3$, and $1 \le b \le 5$.

3. The electrochemical device according to claim 1, wherein the silicon-containing material accounts for 5 wt % to 90 wt % based on the total weight of the negative electrode active material.

4. The electrochemical device according to claim 1, wherein at least one of $R_1$, $R_{12}$, $R_{13}$, $R_{14}$ or $R_{15}$ is fluoro.

5. The electrochemical device according to claim 1, wherein
the compound of Formula I comprises at least one of the following:

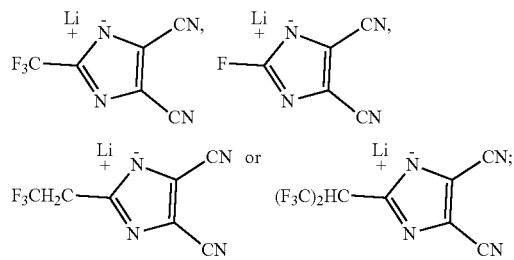

and
the compound of Formula II comprises at least one of the following:

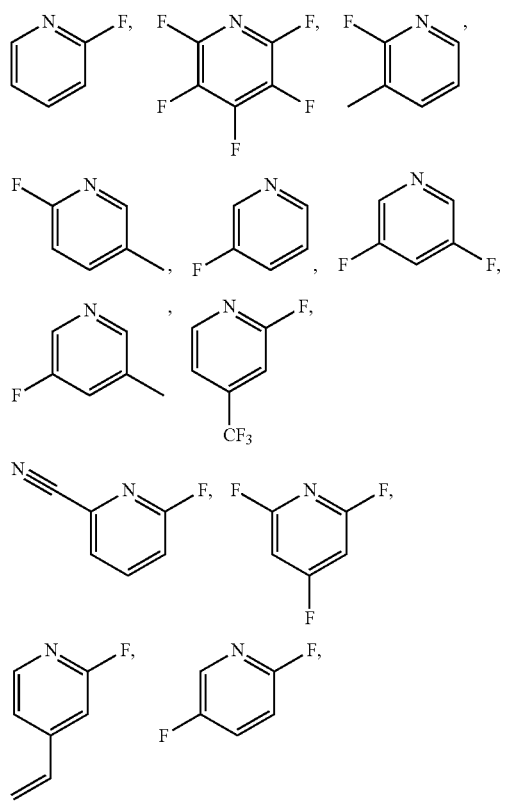

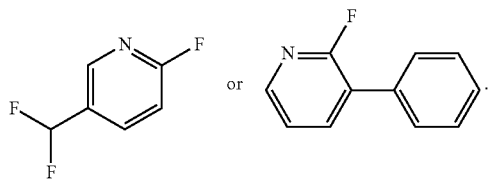

6. The electrochemical device according to claim 1, wherein the electrolyte further comprises a first additive, wherein the first additive comprises at least one of the following: 1,3-propane sultone, vinylene carbonate, fluoroethylene carbonate, 1,3-dioxane, succinic anhydride, adipodinitrile, 1,3,6-hexanetricarbonitrile, 1,2,6-hexanetricarbonitrile, 1,3,5-pentanetricarbonitrile, or lithium difluoro(oxalato)borate.

7. The electrochemical device according to claim 1, wherein the compound of Formula III comprises at least one of the following:

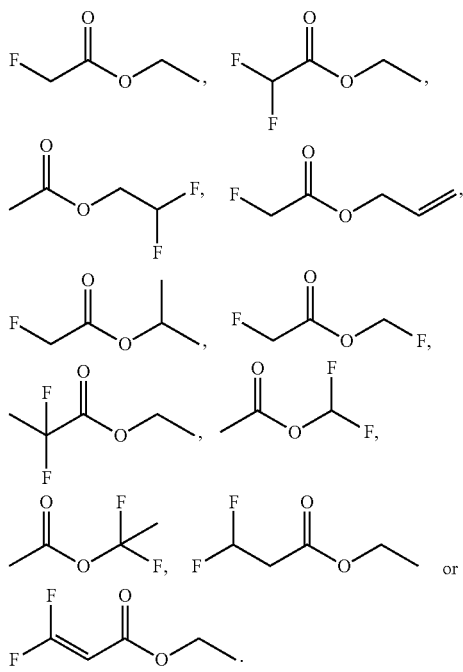

8. An electronic device, comprising an electrochemical device, wherein the electrochemical device comprises a positive electrode, a negative electrode, and an electrolyte, wherein
the electrolyte comprises a compound of Formula I, a compound of Formula II, and a compound of Formula III:

Formula I

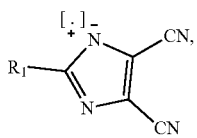

-continued

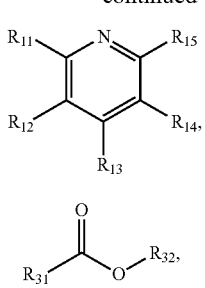
Formula II

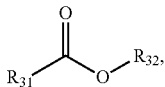
Formula III wherein,
$R_1$ is selected from halo, cyano, substituted or unsubstituted $C_1$-$C_{12}$ alkyl, substituted or unsubstituted $C_2$-$C_{12}$ alkenyl, substituted or unsubstituted $C_2$-$C_{12}$ alkynyl, substituted or unsubstituted $C_2$-$C_{12}$ alkoxy, substituted or unsubstituted $C_3$-$C_{12}$ cycloalkyl, and substituted or unsubstituted $C_6$-$C_{12}$ aryl; and $R_{11}$, $R_{12}$, $R_{13}$, $R_{14}$ and $R_{15}$ are each independently selected from H, halo, cyano, substituted or unsubstituted $C_1$-$C_{12}$ alkyl, substituted or unsubstituted $C_2$-$C_{12}$ alkenyl, substituted or unsubstituted $C_2$-$C_{12}$ alkynyl, substituted or unsubstituted $C_2$-$C_{12}$ alkoxy, substituted or unsubstituted $C_3$-$C_{12}$ cycloalkyl, and substituted or unsubstituted $C_6$-$C_{12}$ aryl, and wherein when substituted, the substituent is halo or cyano;

$R_{31}$ and $R_{32}$ are each independently selected from substituted or unsubstituted $C_1$-$C_{12}$ alkyl, substituted or unsubstituted $C_2$-$C_{12}$ alkenyl, substituted or unsubstituted $C_2$-$C_{12}$ alkynyl, wherein when substituted, the substituent is halo, and at least one of $R_{31}$ or $R_{32}$ is substituted with halo; wherein the compound of Formula III in the electrolyte accounts for 5 wt % to 40 wt % based on the total weight of the organic solvent in the electrolyte;

the negative electrode comprises a negative electrode active material, and the negative electrode active material comprises at least one of a carbon-containing material or a silicon containing material; and the electrolyte has 0.0001-0.005 g of the compound of Formula I for each gram of the negative electrode active material, and 0.0001-0.01 g of the compound of Formula II for each gram of the negative electrode active material.

9. The electronic device according to claim 8, wherein the electrolyte has 0.00005 g to 0.08 g of the compound of Formula I for each gram of the negative electrode active material.

* * * * *